Sept. 24, 1963   M. L. BAXTER, JR   3,104,557
NON-GENERATED STRAIGHT BEVEL GEARS
Filed March 3, 1961   3 Sheets-Sheet 1
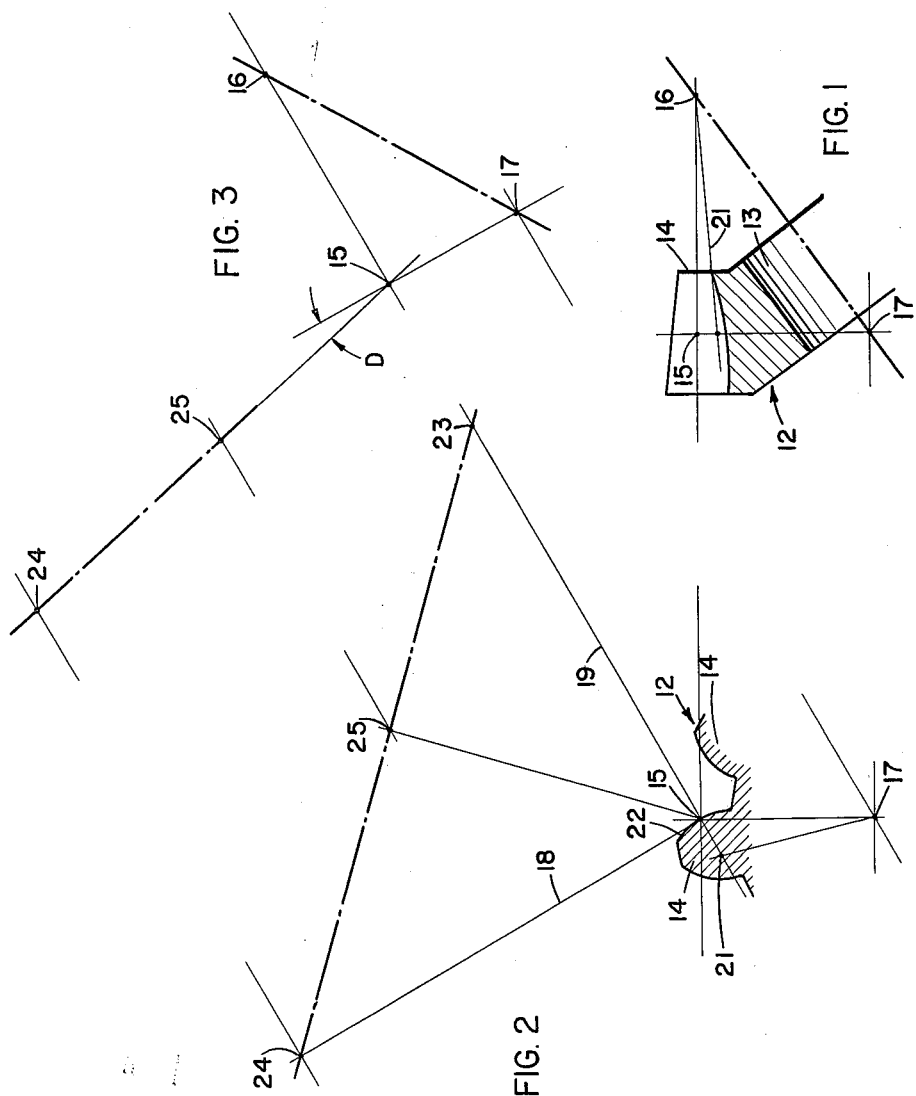
INVENTOR.
MERIWETHER L. BAXTER, JR.
BY
Richard W. Treverton
ATTORNEY

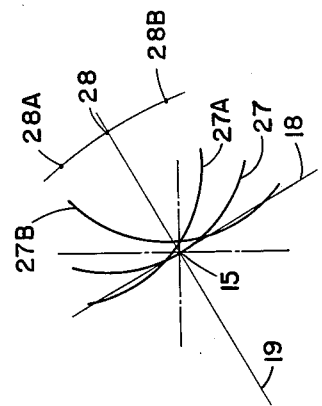
FIG. 4
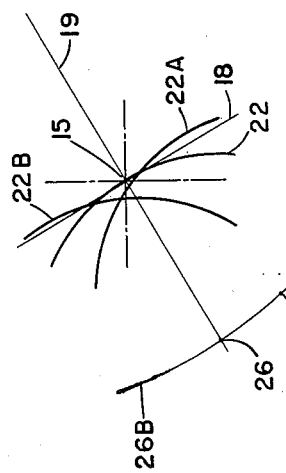
FIG. 6
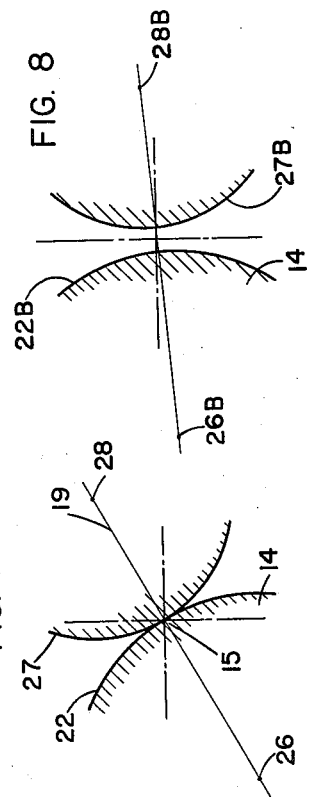
FIG. 5 / FIG. 7
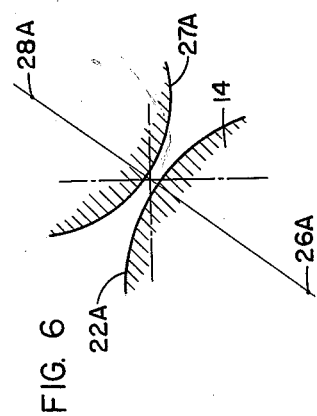
FIG. 8

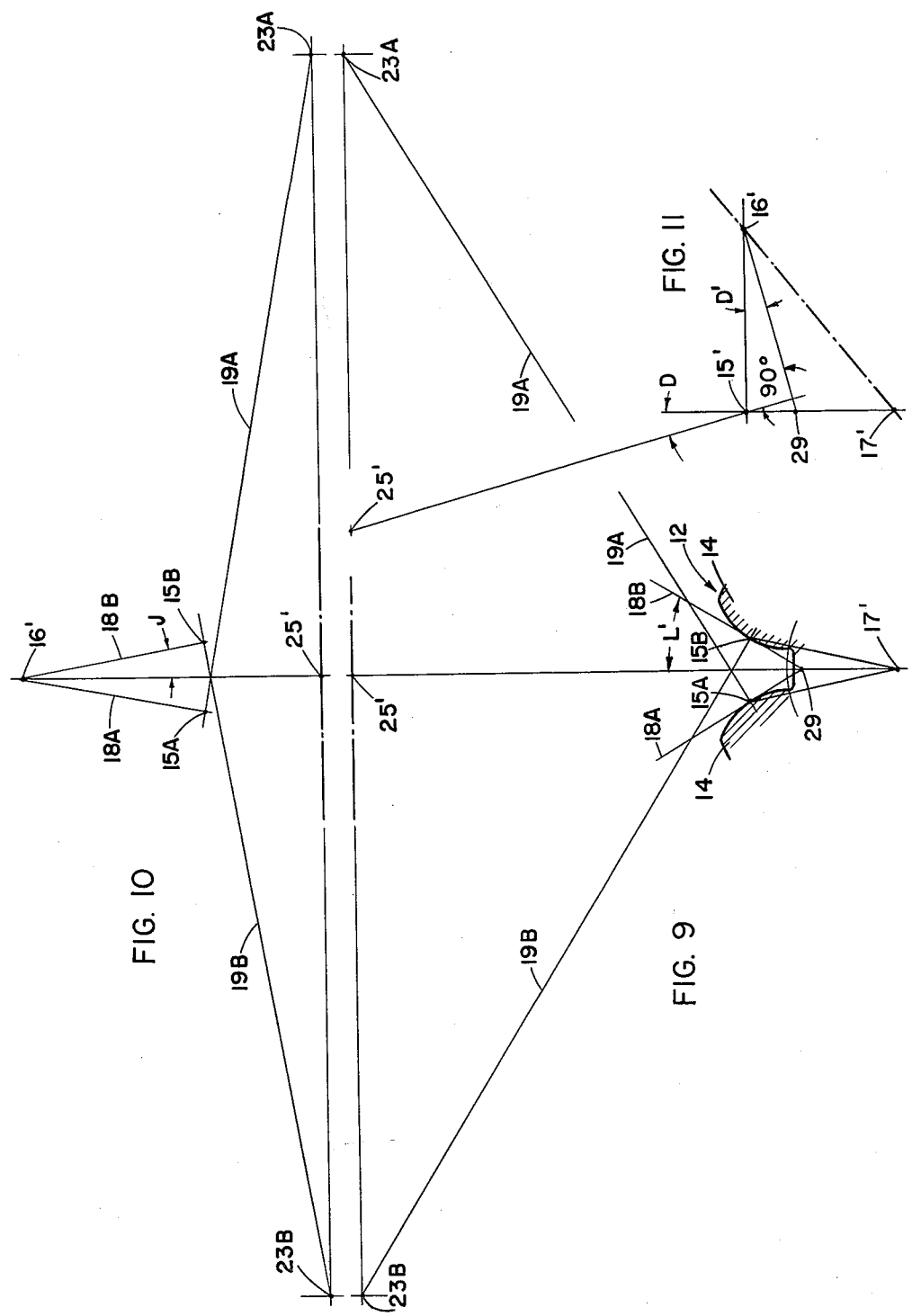

United States Patent Office 3,104,557
Patented Sept. 24, 1963

3,104,557
NON-GENERATED STRAIGHT BEVEL GEARS
Meriwether L. Baxter, Jr., Rochester, N.Y., assignor to The Gleason Works, Rochester, N.Y., a corporation of New York
Filed Mar. 3, 1961, Ser. No. 93,255
10 Claims. (Cl. 74—459.5)

The present invention relates to straight bevel gears having non-generated tooth sides.

The tooth side surfaces of conventional bevel gears are made up of straight-line elements containing the gear cone apex. Such a surface is mathematically a non-circular cone, and requires for its generation a combination of motions accurately timed together. Furthermore, only a small segment of the finished surface is produced at a given instant. Thus manufacture is expensive in terms of both machine complexity and elapsed time.

The object of this invention is to enable the tooth sides of mating gears to be surfaces of revolution, which can be produced much more economically, and which will, by reason of their relationship, adequately fulfill operating requirements for many purposes.

According to the invention each of the surfaces of revolution is convex in any plane therethrough which contains the axis of revolution and concave in any plane therethrough perpendicular to said axis, said surfaces being such that tangent point contact exists between mating tooth sides in every phase of mesh and that in one phase of mesh the contact is at a middle point of the tooth sides, the contacting tooth sides in said one phase being relatively convex in a plane containing the contact normal and the common cone apex of the gears.

In the accompanying drawings, all of which are diagrammatic:

FIG. 1 is a section of a gear in a plane containing the gear axis;

FIG. 2 is a transverse section in a plane containing line 15—17, and perpendicular to line 15—16, of FIG. 1;

FIG. 3 is in a plane containing line 15—24, and perpendicular to line 19, of FIG. 2;

FIGS. 4 to 8 inclusive are views in the plane of FIG. 2, and parallel planes, on a larger scale;

FIG. 9 is another view in the same plane as FIG. 2, illustrating the preferred condition wherein the opposite sides of the tooth slot are coaxial surfaces of revolution;

FIG. 10 is a view in a plane perpendicular to both FIGS. 9 and 11; and,

FIG. 11 is a view in a plane perpendicular to axis 23A—23B, and containing points 17' and 25', of FIG. 9.

The particular bevel gear 12 shown in FIGS. 1 and 2 has an axial bore 13 and a plurality of teeth 14. In FIG. 1 point 15 is a selected middle point on a tooth side surface and lies in the plane of the view as does also the gear cone apex 16 and the gear axis 16—17. Line 15—16, referred to hereinafter as the basic tooth element, is a line through apex 16 tangent to the tooth surface at 15. Line 15—17 is the trace of a plane perpendicular to the basic tooth element, referred to hereinafter as the transverse plane, and point 17 is the trace of the axis in this plane.

In FIG. 2, which is a view in the transverse plane looking toward apex 16, line 18 is the trace of a plane tangent to the tooth surface at point 15, its direction being determined by the tooth pressure angle. 19 is a line normal to the tooth side surface at 15 and therefore perpendicular to the tangent plane. When point 15 is a point of contact with a mating gear tooth surface, normal 19 intersects the instantaneous axis of relative motion of the gears at 21. In case of mitre gears, having equal addenda and dedenda, 21 would extend through point 15, but in the general case illustrated it is spaced therefrom. Curve 22 is the trace of the tooth side surface in the transverse plane; its degree of curvature may be chosen according to well-known theory, such as given in Wildhaber Patent No. 2,230,418, with some slight additional convexity to impart adjustability to the gear pair.

Point 23 is the intersection of the axis of revolution of the tooth surface with normal 19; point 24 is the trace of the axis of revolution in the tangent plane. Point 25 lies on the axis of revolution, line 15—25 being perpendicular thereto. Line 23—24 is therefore the projection of the axis of revolution, which may also be the axis of a rotating tool used to form the surface. Since the tooth surface is a surface of revolution about axis 23—24, it is concave in every plane extending through it that is perpendicular to said axis.

In FIG. 3, which is a view of the tangent plane, looking along the normal 19 toward the tooth surface, that is, from 23 toward 15, line 15—16 is the basic tooth element, 16—17 is the projection of the gear axis, 15—17 is the trace of the transverse plane, and 24—25 is the projection of the axis of revolution. Line 24—25 is also the trace of the plane containing the axis of revolution and the tooth normal, referred to hereinafter as the normal plane. The normal plane makes an angle D with the transverse plane.

To permit tooth operation without interferences, it is necessary that the mating surfaces not be relatively concave in any normal section through the mean normal 19. This condition obtains when each tooth surface of each gear is convex in the direction of its basic tooth element 15—16. This invention provides the necessary relationships between the angle D and the normal distance 15—23 to obtain such convexity. The symbols employed in expressing the relationships may be defined as follows:

$R_T$ is the radius of curvature of desired tooth profile 22 in transverse section.
H is the distance 15—23, along the normal 19 from the tooth surface to the axis of revolution 23—25—24.
D is the angle between normal plane and transverse plane.
R is the radius of curvature of the tooth surface in a plane containing the axis of revolution 23—25—24.
$R_N$ is the radius of curvature of the tooth surface in the normal plane through 15 which contains the cone apex.

The following relationships hold:

$$\frac{1}{R_N} = \frac{\sin^2 D}{R} - \frac{\cos^2 D}{H}$$

$$\frac{1}{R_T} = \frac{\cos^2 D}{R} - \frac{\sin^2 D}{H}$$

The tooth curvature is convex in the direction of its basic tooth element 15—16 when the value of $R_N$ is positive.

FIG. 4, the enlarged view of a portion of FIG. 2, is exaggerated for clarity. The section of the tooth surface is 22, whose center of curvature is at 26. In another transverse plane situated farther from the apex, the section of the tooth surface is 22A, with center of curvature at 26A; similarly in a transverse plane taken closer to the apex, the tooth surface section is 22B and center 26B. Although 22A and 22B extend beyond the tangent plane 18, they nevertheless intersect normal 19 behind 18 and thus achieve the desired result.

FIG. 5 is a view similar to FIG. 4, but shows at 27, 27A and 27B the tooth surface sections of a mating tooth in the respective three transverse sections of sections 22, 22A and 22B, the centers of curvature being designated 28, 28A and 28B.

FIGS. 6, 7 and 8 are similar to FIGS. 4 and 5, but show the three transverse planes individually. In FIG. 7 it is seen that the surfaces 22 and 27 contact at point 15. FIGS. 6 and 8 show that sections 22A and 27A and sections 22B and 27B of the mating tooth surfaces clear each other; the amount of this clearance depends upon the values of $R_N$ for the two members obtained by the foregoing equations and may be readily computed. If the value of $R_N$ is positive for both tooth members of the pair or if the sum of the reciprocal of these values for the two members is positive, the major object of the invention is met.

It will be understood that the amount of clearance shown in FIGS. 6 and 8 is very greatly exaggerated, and in practice should be on the order of a few thousandths of an inch, i.e. only enough to provide the desired localization of tooth bearing.

It is desirable, from the standpoint of eliminating bias tooth bearing, that the point of closest approach of the teeth in sections in transverse planes away from the means point remain near the basic tooth element. This condition is achieved by choosing the design of the mating teeth such that the value of the following expression is approximately the same for the teeth of both members:

$$\left(\frac{1}{R}+\frac{1}{H}\right) \sin D \cos D$$

A preferred configuration of the invention permits simultaneous forming of both sides of a tooth slot by choosing the same axis of revolution for the two tooth surfaces of the opposite sides of the slot. In FIG. 9, which is a transverse section of a tooth slot, 17' is the trace of the gear axis; 18A and 18B are traces of tangent planes to the tooth surfaces at means points 15A and 15B; and 19A and 19B are projections of the surface normals at 15A and 15B.

Line 23A—25'—23B is the common axis of revolution, intersecting the normals at points 23A and 23B, whose distances from 15A and 15B respectively fulfill the foregoing equations. The common axis of revolution is preferably perpendicular to the central plane of the tooth slot.

FIG. 10 shows the basic tooth elements of FIG. 9, containing the points 15A, 15B and the apex 16'. These elements, which are also the traces in the plane of this view of the tangent planes 18A and 18B, intersect at the apex, as is usually the case.

FIG. 11 shows the central plane of the tooth slot, containing apex 16' and gear axis 16'—17'. Line 16'—29 is the intersection of the tangent planes 18A and 18B, and the normal plane for both tooth surfaces projects into the line 15'—25' which is perpendicular to 16'—29. The axis of revolution projects into this view as point 25'. Line 15'—16' is the trace on the central plane of either basic tooth element, 15A—16' or 15B—16', and D' is the angle between this trace and the intersection line 16'—29.

If the tangent planes be specified according to the desired tooth numbers, pressure angle and pitch, say by the angles J and L' which either tangent plane forms with the central plane in the respective planes of FIG. 10 and FIG. 9, then the direction of the normal plane is fixed, and the angle D may be obtained as follows:

Let
$$\tan D' = \tan J \operatorname{ctn} L'$$

Then
$$\tan L = \tan L' \sec D'$$

$$\tan D = \tan D' \sec L$$

While for ease of manufacture the tooth sections in planes containing the axes of the surfaces of revolution are preferably circular arcs, as described in the aforementioned Wildhaber patent, other tooth profile shapes, such for example as the conventional involute shape, may be employed.

Having now described the improved gears, what I claim as my invention is:

1. A pair of bevel gears each having tooth sides which are surfaces of revolution, each such surface being convex in any plane therethrough which contains the axis of revolution and concave in any plane therethrough perpendicular to said axis, said surfaces being such that tangent point contact exists between mating tooth sides in every phase of mesh and that in one phase of mesh the contact is at a middle point of the tooth sides, the contacting tooth sides in said one phase being relatively convex in a plane containing the contact normal and the common cone apex of the gears.

2. A pair of gears according to claim 1 in which both of the contacting tooth sides are convex in said plane containing the contact normal.

3. A pair of gears according to claim 1 in which each of said surfaces of revolution are arcs of circles in a plane containing the axis of the surface.

4. A pair of gears according to claim 1 in which the contact normal in said one phase of mesh intersects the instantaneous axis of relative rotation of the pair.

5. A pair of gears according to claim 1 in which in each gear the two tooth sides comon to each tooth slot are coaxial surfaces of revolution.

6. A pair of gears according to claim 5 in which the axis of said surfaces of revolution of the two tooth sides is perpendicular to a gear axial plane central of the slot.

7. A pair of bevel gears each having tooth sides which are surfaces of revolution, each such surface being convex in any plane therethrough which contains the axis of revolution and concave in any plane therethrough perpendicular to said axis, said surfaces being such that tangent point contact exists between mating tooth sides in every phase of mesh and that in one phase of mesh the contact is at a middle point of the tooth sides, the sum of the reciprocals of the values $R_N$ for the two gears being positive when such value for each is determined by the formula $$\frac{1}{R_N}=\frac{\sin^2 D}{R}-\frac{\cos^2 D}{H}$$

where $R_N$ is the radius of curvature of the tooth surface in a normal plane containing said middle point of the tooth side and the gear cone apex, R is the radius of curvature of the tooth surface in a plane containing said axis of revolution, H is the distance along said tooth normal from the tooth surface to the axis of the surface of revolution, and D is the angle between said normal plane and the transverse plane containing said middle point.

8. A pair of bevel gears according to claim 7 in which the value of $R_N$ is positive for each gear.

9. A pair of bevel gears according to claim 7 in which the value of $$\left(\frac{1}{R}+\frac{1}{H}\right) \sin D \cos D$$

is approximately the same for both gears.

10. A pair of bevel gears according to claim 7 in which in each gear the two tooth sides common to each tooth slot are coaxial surfaces of revolution and in which the angle D has the value determined by:

$$\tan D' = \tan J \ctn L'$$
$$\tan L = \tan L' \sec D'$$
$$\tan D = \tan D' \sec L$$

where D' is the angle in the central plane of the tooth slot between the trace thereon of the basic tooth elements of the tooth sides and the line of intersection of the tangent planes of the tooth sides, J is the angle between said central plane and each basic tooth element, and L' is the angle measured in the transverse plane between the central plane of the tooth slot and each of said tangent planes.

References Cited in the file of this patent

UNITED STATES PATENTS

| | | |
|---|---|---|
| 1,710,349 | Croft | Apr. 23, 1929 |
| 1,763,177 | Perkins | June 10, 1930 |
| 2,105,104 | Wildhaber et al. | Jan. 11, 1938 |
| 2,230,418 | Wildhaber | Feb. 14, 1941 |
| 2,436,276 | Wildhaber | Feb. 17, 1948 |